United States Patent [19]
Jennings

[11] Patent Number: 5,690,427
[45] Date of Patent: Nov. 25, 1997

[54] VARIABLE SPEED FOOD MIXER INCORPORATING A VARIABLE TRANSMISSION RATIO BELT DRIVE

[75] Inventor: Garry Stuart Jennings, Bideford, United Kingdom

[73] Assignee: Premark FEG L.L.C., Wilmington, Del.

[21] Appl. No.: 552,097

[22] Filed: Nov. 2, 1995

[30] Foreign Application Priority Data

Apr. 11, 1994 [GB] United Kingdom ............... 9422270

[51] Int. Cl.⁶ ........................................ B29B 7/22
[52] U.S. Cl. ................. 366/100; 366/287; 474/46
[58] Field of Search .................. 366/64, 65, 96–98, 366/100, 197, 198, 200, 202, 203, 207, 287, 288, 601; 474/24, 28, 31, 46

[56] References Cited

U.S. PATENT DOCUMENTS

| | | | |
|---|---|---|---|
| 1,781,321 | 11/1930 | Dehuff | 474/31 |
| 1,890,500 | 12/1932 | Dehuff | 474/31 |
| 2,181,079 | 11/1939 | Dehuff | 366/207 |
| 3,018,666 | 1/1962 | Hoffman | 474/28 |
| 3,698,256 | 10/1972 | Albertson | 474/28 X |
| 4,089,232 | 5/1978 | Llach et al. | 474/28 |
| 4,311,397 | 1/1982 | Wright | 366/287 X |
| 4,411,590 | 10/1983 | Meredith | |
| 4,432,743 | 2/1984 | Pitoiset | 474/46 X |
| 4,608,029 | 8/1986 | Corrigan | |
| 4,838,834 | 6/1989 | Miyata | 474/28 X |
| 5,048,302 | 9/1991 | Hagenlocher et al. | |

FOREIGN PATENT DOCUMENTS

| | | | |
|---|---|---|---|
| 722395 | 7/1942 | Germany | |
| 1134642 | 8/1962 | Germany | |
| 412842 | 2/1946 | Italy | 366/100 |
| 487006 | 11/1953 | Italy | 366/96 |
| 298317 | 10/1928 | United Kingdom | |

*Primary Examiner*—Charles E. Cooley
*Attorney, Agent, or Firm*—Thompson Hine & Flory LLP

[57] ABSTRACT

A food mixer in which a variable speed facility is provided by a variable transmission ratio belt drive incorporated in the drive train between an electric motor and a whipping or mixing tool. The belt drive comprises a V-belt extending around first and second pulleys each comprising two discs one of which is movable towards and away from the other. In the first pulley, the upper disc can be forced towards the lower disc by downward pivoting of a lever operated by an actuator, while in the second pulley, the lower disc is urged by a spring upwardly towards the upper disc. The effective transmission ratio is sensed by a position sensor acting on the lever and which provides a corresponding signal to controller circuitry which compares the sensed ratio with a pre-set ratio and operates the actuator to bring the sensed ratio and pre-set ratio into correspondence.

10 Claims, 3 Drawing Sheets

VARIABLE SPEED FOOD MIXER INCORPORATING A VARIABLE TRANSMISSION RATIO BELT DRIVE

FIELD OF THE INVENTION

THIS INVENTION relates to a variable speed control system for a rotatable member. The invention also relates to a food mixer incorporating such a variable speed control system.

SUMMARY OF THE INVENTION

It is an object of the present invention to provide an improved variable speed control system suitable, inter alia, for a food mixer.

According to one aspect of the invention there is provided a speed control system for a rotatable member comprising driving means driving a first pulley, a second pulley driving the rotatable member, a driving belt extending around the first and second pulleys and forming a driving connection between the same, at least one of said first and second pulleys being a pulley of which the effective diameter is variable by displacement of an associated actuating device, the system including control means for controlling displacement of said actuating device, means for sensing said displacement of said actuating device, or the effective diameter of said one pulley, manually operable setting means for setting the desired transmission ratio between said driving means and said rotatable member, said control means including means for comparing the position or state of said setting means with the position of said actuating device and for causing said actuating device to be displaced until its position corresponds with the desired transmission ratio as determined by said setting means.

According to another aspect of the invention there is provided a food mixer incorporating such a speed control system.

BRIEF DESCRIPTION OF THE DRAWING

An embodiment of the invention is described below by way of example with reference to the accompanying drawings in which.

DESCRIPTION OF THE PREFERRED EMBODIMENT

Figure 1:
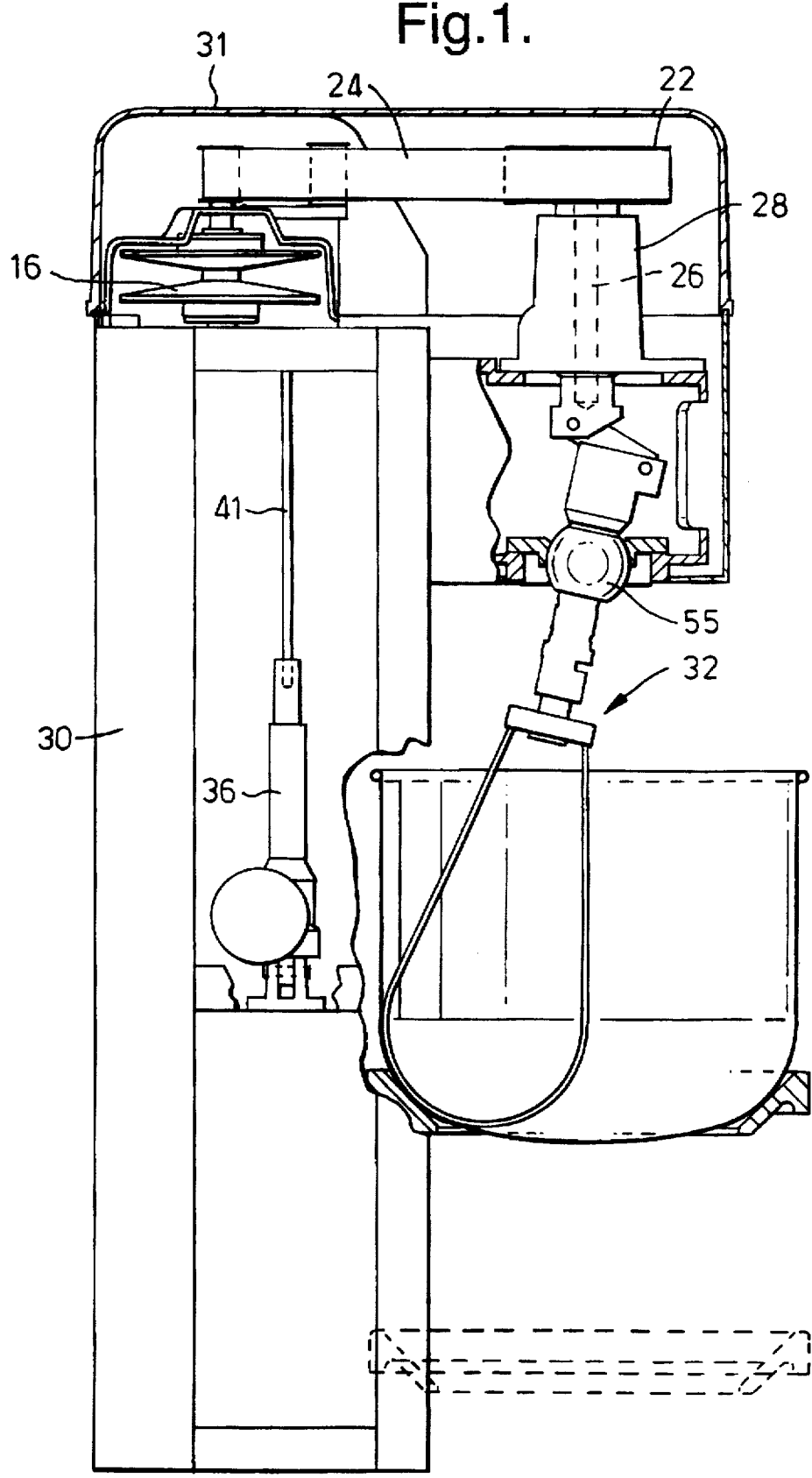
FIG. 1 is a view, partly in side elevation, with parts broken away, and partly in vertical selection, on the line I—I in FIG. 2, of a food mixer incorporating a speed control system embodying the invention.
Figure 2:
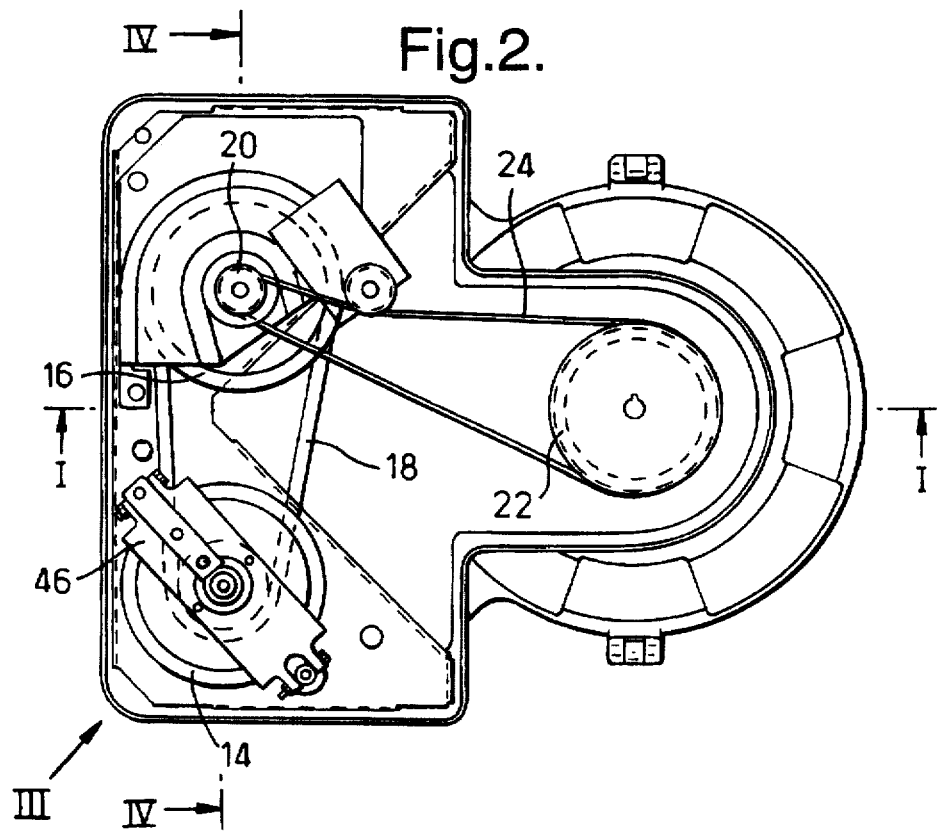
FIG. 2 is a plan view of the mixer of FIG. 1 with a top cover panel omitted for purposes of illustration.
Figure 4:
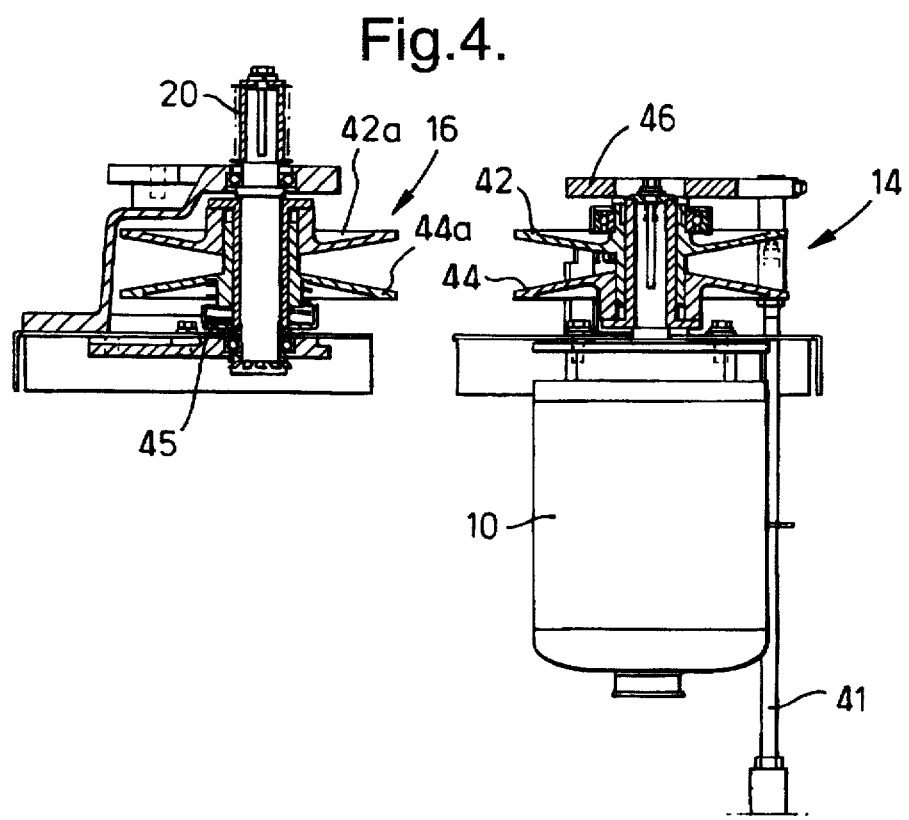
FIG. 4 is a partial vertical section view on the line IV—IV of a prototype mixer embodying the invention.
Figure 3:
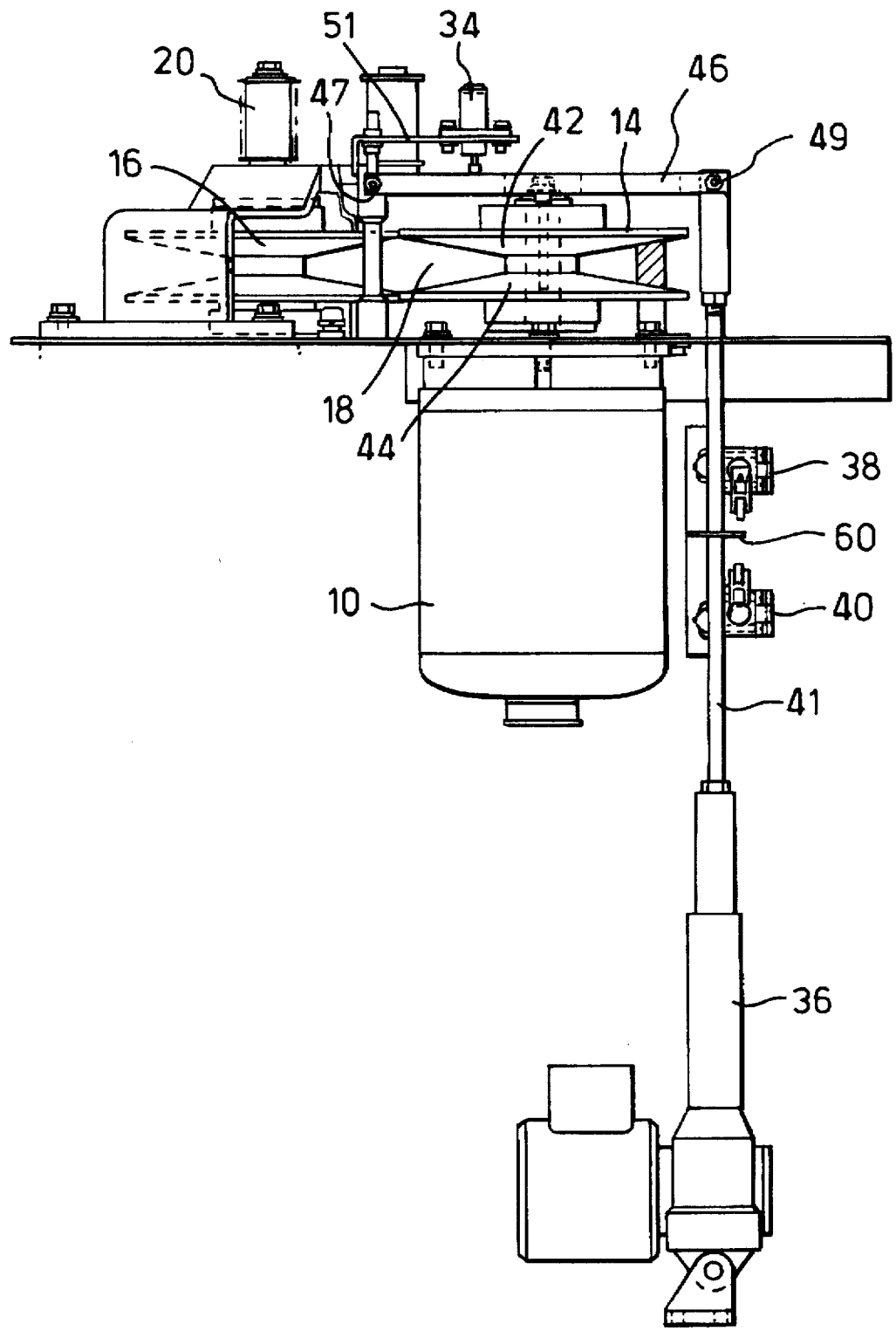
FIG. 3 is a fragmentary side view of the mixer of FIGS. 1 and 2, viewed in the direction of arrow III in FIG. 2.

The food mixer shown in the figures is a so-called "whipper mixer" for use in a bakery. The mixer includes a frame 30 in which is mounted driving means in the form of a 3 phase, 400 volt, 50 Hz electric motor 10 having a vertical output shaft carrying a variable speed pulley 14 which drives a pulley 16 rotatably mounted on the frame 30, via a driving belt 18, which may, as shown, be a broad V-belt. The pulley 16 may, as shown, also be a variable speed pulley. The pulley 16 in turn drives a co-axial toothed belt pulley 20 which in turn drives a toothed belt pulley 22 via a toothed belt 24. The pulley 22 is carried at the upper end of a rotatably mounted vertical shaft 26 passing through bearings (not shown) in a head part 28 of a machine body or frame 30, the shaft 26 being connected with a suitable whipping tool, indicated at 32, rotatably and pivotally supported in the frame.

The arrangement of the mixer shown is such that the tool 32 is rotatable about its longitudinal axis, which is inclined with respect to the vertical, in a bearing block 55 which bearing block 55 is externally in the form of a spherical ball which is journalled, for swivelling movement, about horizontal axes, in a complementary bearing arrangement secured to the frame. Means is provided for rotating the vertical plane, in which the longitudinal axis of tool 32 lies, about the vertical axis of pulley 22 at a rate substantially slower than the rate at which tool 32 is rotated about its axis. That is to say, the tool 32 is arranged to describe an orbital motion. Furthermore, the angle of the longitudinal axis of tool 32 to the vertical can also be varied by vertical movement of a bearing block, within head part 28, supporting a member pivotally connected by a link with a member carried on the end of the tool shaft, thereby to pivot the tool in vertical planes about the centre of spherical bearing block 55.

In the arrangement shown, the pulleys 14, 16, 20 and 22 are disposed at the upper ends of their respective vertical shafts projecting above the upper end of the frame 30. These pulleys, and the driving belts 18 and 24, are contained within an upper housing part or cover 31, which shields personnel from these moving parts and provides a hygienic barrier between these parts and the surroundings. The transmission ratio between motor 10 and shaft 26 is variable, by means of the variable speed pulleys 14, 16, in such a way as to allow the overall final drive speed of shaft 26 to be adjustable from 100 to 450 rpm. The speed of shaft 26 is controllable by a control system which comprises an electronic control circuit (not shown) including a control printed circuit board (PCB) (not shown). The control system further comprises a speed selection rotary switch (not shown), a linear position sensor 34, a linear actuator 36, and limit switches 38 and 40.

The final drive speed is varied by changing the drive ratio between the pulley 14 and the pulley 16. The pulley 14 comprises, in manner known per se, two opposing conical discs 42, 44 coaxial with the shaft of motor 10 and which are movable towards and away from one another under the control of a lever 46 pivoted at 47 to a support post projecting upwardly from frame 30. The V-belt 18 engages the opposing conical surfaces of the discs 42, 44, and the effective diameter of the pulley 14, corresponding to the location engaged by belt 18, depends upon the spacing between the discs 42, 44 and is increased as the discs 42, 44 are brought closer together and decreased as the discs 42, 44 move further apart. The pulley 16 is of construction similar to that of pulley 14, comprising an upper disc 42a and a lower disc 44a. However, in the pulley 16, the lower disc 44a is urged towards the upper disc 42a by means of a spring 45, whilst in the pulley 14, the upper disc 42 is urged towards the lower disc 44 by means of the lever 46, acting on a sleeve of the upper disc 42 via a thrust bearing arrangement. Accordingly, the tension in belt 18 serves to hold the discs 42a, 44a apart against the action of spring 45, and also urges the discs 42, 44, apart against the thrust of lever 46. Thus, the pulley 16 increases in effective diameter as the effective diameter of pulley 14 decreases, and vice versa, and the tension in belt 18 is maintained. Alternatively, pulley 16 might be of fixed diameter and tension in belt 18 might be maintained in some other way, for example by means of a tensioning or jockey pulley bearing on the belt.

The position of the lever 46, and thus the drive ratio of the pulley arrangement, is controlled by the linear actuator 36 which has a body fixed to the frame 30 and a longitudinally vertically movable actuator rod 41 pivotally connected at 49 to the lever 46 bearing on the upper end of control pulley 14 as shown in the figures.

The desired speed is selected by the operator adjusting the position of a single turn, ten-position rotary switch (not shown) mounted on a control panel (not shown) of the machine. The speed is indicated to the operator by the position of the knob of this rotary switch. A further indication may be provided by an increasing wedge scale.

The linear position sensor 34 is secured to a bracket 51 secured to frame 30 and has a stylus or plunger which bears on the upper surface of lever 46. The sensor 34 senses the position of lever 46 and thus, (indirectly) the diameter of the variable speed control pulley, and the corresponding drive ratio. The sensor 34 provides, to the electronic control circuit, an electrical signal indicative of the position of the lever 46. The ten-position rotary switch provides to this control circuit an electrical signal significant of the desired drive ratio, and thus significant of the desired position of lever 46. The control circuit compares the output signal from the linear position sensor 34 with the signal from the rotary switch and if these values do not match then the control circuit drives the motor of the linear actuator 36 in the correct direction until the signals from the sensor 34 and the rotary switch correspond, signifying that the pulley faces are at the correct relative positions for the set point speed.

The control circuit is also arranged to ensure that the linear actuator is driven to a "home" position on power up and when the machine is switched off by operation of a stop button (not shown) situated on the mixer control panel. The home position is the minimum speed position.

The mixer is started by operation of a start button (not shown).

The start button is disabled until the linear position sensor has reached a position corresponding to the home position of the actuator 36.

An appropriate interlock arrangement (not shown) ensures that the linear actuator 36 cannot increase the transmission ratio if the main mixer motor 10 is not operating.

Upper and lower limit switches 38 and 40 are mounted on the frame 30 and have actuating rollers disposed in the path of a lug 60 fixed to the actuator rod 41 of actuator 36. The switch 38 is operated by lug 60 at an upper extreme position of the actuator rod and the switch 40 is operated at a lower extreme position of the actuator rod.

The control circuit is also so arranged that the speed control linear actuator 36 stops, the main mixer drive motor 10 stops, and the start button is disabled if any of the following faults occur and that an audible alarm sounds for 10 seconds to indicate a fault has occurred.

(a) If for any reason the controller cannot find the home position or the linear position sensor voltage is out of the normal voltage range a fault indication circuit operates and, as a result, the linear actuator stops, the mixer main drive motor stops, the start button is disabled, and a fault indication LED remains on until the fault indication circuit is reset by isolating the electrical supply to the machine.

(b) If a voltage is applied to the linear actuator 36 so as to tend to move the actuator rod and lever 46 and yet there is no change in the signal from position sensor 34 for two seconds, the output voltage to the linear actuator 36 is cut off automatically and an LED is illuminated to indicate a fault. The mixer main drive motor 10 is furthermore stopped, the start button is disabled and the fault indication LED remains on until the fault is reset by isolating the electrical supply to the machine.

(c) If an upper limit switch 38 is opened, the mixer main drive motor 10 stops, the speed control linear actuator 36 stops, the start button is disabled, and the PCB fault indication LED remains on until the fault indication circuit is reset by isolating the electrical supply to the machine.

(d) Likewise, if the lower limit switch 40 is opened the mixer main drive motor 10 stops, the speed control linear actuator 36 stops, the start button is disabled, and the PCB fault indication LED remains on until the fault indication circuit is reset by isolating the electrical supply to the machine.

The control circuit may include a microprocessor operating under a program stored in an EPROM included in the circuit and such as to provide the above-noted functions.

Whilst the variable ratio transmission has been described as a pulley transmission, it will be appreciated that any other form of continuously variable transmission may be used, for example incorporating a conically tapering shaft frictionally engaging the periphery of a driving or driven disk, with the disk being axially displaceable relative to the shaft or vice versa in manner known per se.

I claim:

1. A food mixer having a rotatable mixing tool and incorporating a speed control system, said speed control system comprising:

a first pulley;

driving means driving said first pulley;

a second pulley driving the rotatable mixing tool, at least one of said first and second pulleys being a pulley of which the effective diameter is variable;

a driving belt extending around said first and second pulleys and forming a driving connection between said first and second pulleys;

a displaceable actuating device for varying the effective diameter of said at least one pulley;

control means for controlling displacement of said actuating device;

a sensor for sensing displacement of said actuating device;

a manually operable switch for setting a desired transmission ratio between said driving means and said rotatable mixing tool, said control means including means for comparing said setting of said switch with said displacement of said actuating device and for causing said actuating device to be displaced until its displacement corresponds with a desired transmission ratio as determined by said switch.

2. A food mixer comprising:

a frame, a mixing tool, means supporting said mixing tool for rotation relative to said frame, a first pulley and a second pulley mounted for rotation relative to said frame, a driving belt extending around the first and second pulleys and forming a driving connection between said pulleys, driving means for driving said first pulley and a drive train providing a driving connection between said driving means, said first pulley, said second pulley and said mixing tool, at least one of said first and second pulleys being a pulley of which the effective diameter is variable, and control means for varying said effective diameter to vary the transmission ratio between said first and second pulleys and thus between said driving means and said mixing tool, wherein said control means includes a sensor for sensing the effective diameter of said variable pulley; means to compare said effective diameter to a desired transmission ratio; and means to adjust said effective diameter to provide said desired transmission ratio.

3. A food mixer according to claim 2, wherein said pulley of variable diameter comprises two co-axial, axially spaced discs having opposing frusto-conical surfaces, means mounting at least one of said discs for axial movement towards and away from the other, and wherein said belt is a V-belt cooperating with said frusto-conical surfaces.

4. A food mixer according to claim 3, wherein each of said pulleys comprises two coaxial axially spaced discs having opposing frusto-conical surfaces and means mounting at least one disc of each pulley for axial movement towards and away from the other disc of that pulley, and wherein, in one of said pulleys, means is provided biasing one of the pulley discs towards the other, whereas in the other of said pulleys said control means is operable alternatively to urge one of the pulley discs towards the other, or to allow the pulley discs to move apart in reaction to the tension in said belt.

5. The food mixer according to claim 3 wherein the means to adjust the effective diameter includes a linear actuator and a lever pivoted by said linear actuator such that said lever adjusts the axial movement of said at least one of said discs.

6. The food mixer according to claim 5 wherein said control means is a control circuit which compares a signal from said sensor with said desired transmission ratio and if the values do not match then said control means drives said linear actuator until said pulley of variable diameter has the desired effective diameter.

7. The food mixer according to claim 5 further comprising a minimum speed position for said linear actuator such that said control means drives said linear actuator to said position when said mixer is turned off.

8. A food mixer according to claim 2 wherein each of said pulleys is of variable diameter such that as the diameter of one of said pulleys is increased or decreased by said control means, the diameter of the other of said pulleys is decreased or increased respectively to maintain a limited tension in said belt.

9. A food mixer according to claim 2 wherein said driving means is secured to said first pulley and said drive train comprises a third pulley, and a belt extending around said third pulley and a fourth pulley, said fourth pulley for providing rotation to said mixing tool.

10. A food mixer comprising a frame, a mixing tool, means supporting said mixing tool for rotation relative to said frame, a first pulley and a second pulley mounted for rotation relative to said frame, a driving belt extending around the first and second pulleys and forming a driving connection between said pulleys, driving means for driving said first pulley and a drive train providing a driving connection between said driving means, said first pulley, said second pulley, and said mixing tool, at least one of said first and second pulleys being a pulley of which the effective diameter is variable, and control means for varying said effective diameter to vary the transmission ratio between said first and second pulleys and thus between said driving means and said mixing tool, wherein said pulley of variable diameter comprises two co-axial, axially spaced discs having opposing frusto-conical surfaces, means mounting at least one of said discs for axial movement towards and away from the other, and wherein said belt s a V-belt cooperating with said frusto-conical surfaces, wherein said control means includes a lever, actuating means for pivoting said lever, thrust bearing means operable between said movable disc of said variable diameter pulley, whereby pivotal movement of said lever will cause axial displacement of said movable disc via said thrust bearing means, and position sensing means for sensing the position of said lever and for providing a corresponding signal representative of the transmission ratio between said pulleys.

* * * * *